May 7, 1963   J. B. GODSHALK   3,089,073
ELECTRICAL SYSTEMS
Filed Feb. 28, 1958
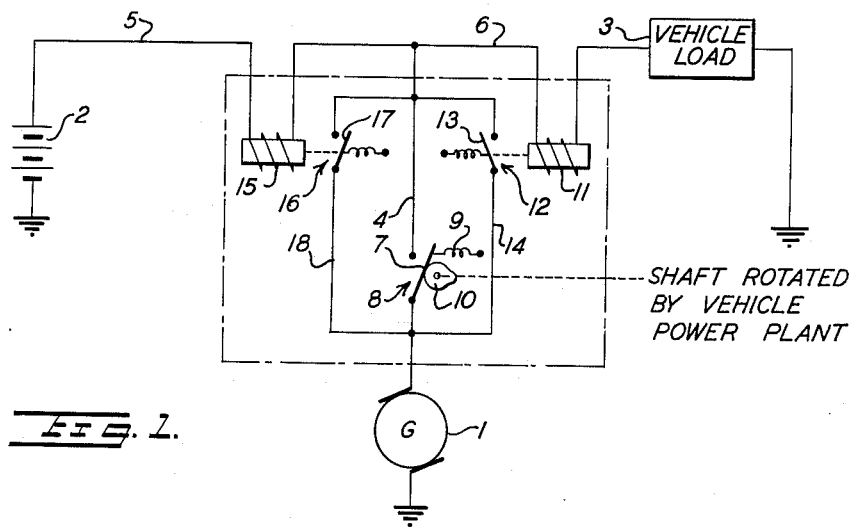
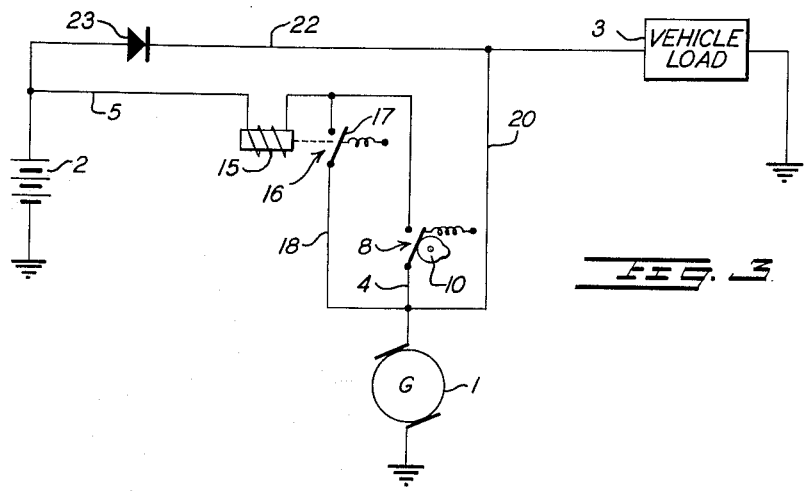
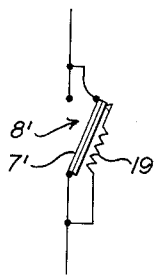
INVENTOR
JAMES B. GODSHALK
BY *D C Roylance*
ATTORNEY

United States Patent Office 3,089,073
Patented May 7, 1963

3,089,073
ELECTRICAL SYSTEMS
James B. Godshalk, West Pikeland Township, Chester County, Pa., assignor to Fox Products Company, Philadelphia, Pa., a corporation of Pennsylvania
Filed Feb. 28, 1958, Ser. No. 718,181
4 Claims. (Cl. 320—21)

This invention relates to electrical systems of the type in which a storage battery and a generator jointly supply a load system with the generator being arranged to maintain the battery at an adequate state of charge. Particularly applicable to electrical systems for automotive vehicles, the invention provides novel means for so controlling the charging operation that the life of the storage battery is increased.

It has been discovered that, if a susbtantially fully charged storage battery is subjected to a continuous D.C. charging current, the life of the battery will be reduced to an extent dependent upon the magnitude of the charging current and the duration thereof. Thus, a D.C. charging current of 0.15 ampere supplied continuously to a 100 ampere-hour automotive type storage battery which is substantially fully charged will destroy the battery in 5 or 6 months. If the charging current is increased to 3.0 amperes, the battery will be destroyed in about 15 days.

In the case of a conventional automobile electrical system, the charging rate is about 3.0 amperes when the automobile is driven at normal speeds with the battery substantially fully charged. It is thus obvious that normal operation of an automobile will result in reduction of the life of the battery, even though the periods of continuous charging are considerably less than 15 days.

Broadly considered, the present invention provides means whereby the charging current supplied by the generator to the battery is cyclically interrupted with the result that the life of the storage battery is significantly increased. In other words, the electrical system of the present invention is so devised that, instead of being subjected to a continuous charging current, the battery is supplied with charging current for short intervals repetitively.

A further object of the invention is to provide a self-contained apparatus which can be incorporated in a conventional electrical system of the type referred to in such manner as to convert the charging action of the generator to a cyclical operation.

Another object is to devise an improved electrical system of the aforementioned type in which the charging action of the generator is made cyclical without interfering with the normal supply of the load or loads connected in the system.

Still another object of the invention is to provide such an apparatus which will charge the battery cyclically, rather than continuously, and will automatically modify its operation so as to provide a continuous generator output when required by heavy loads or substantial discharge of the battery.

In order that the manner in which these and other objects are attained in accordance with the invention can be understood in detail, reference is had to the accompanying drawings, which form a part of this specification, and wherein:

FIG. 1 is a circuit diagram illustrating one embodiment of the invention as applied to the electrical system of an automotive vehicle;

FIG. 2 is a diagrammatic illustration of a modified form of cyclical switch useful in the system, shown in FIG. 1, and FIG. 3 is a circuit diagram illustrating another embodiment of the invention applied to the electrical system of an automotive vehicle.

Referring now to the drawings in detail, it will be seen that this embodiment of the invention is associated with a conventional automotive electrical system comprising a D.C. generator 1, driven from the vehicle power plant in the usual manner, a storage battery 2 and a vehicle load system 3, the system being equipped with the usual voltage regulator (not shown). The output of the generator is connected to the battery and the vehicle load via a circuit comprising conductors 4 and 5, on the one hand, and a circuit comprising conductors 4 and 6, on the other. Thus, whether the generator 1 is supplying current to charge the battery 2, or to supply the loads 3, current must pass via conductor 4.

Connected in conductor 4, in series with the generator 1, is the movable contact 7 of a cyclically operated interrupter switch 8. Movable contact 7 is biased to a normally open position, disabling the generator, as by means of spring 9. The switch is closed, to allow current to flow via conductor 4, by means of a continuously rotated cam 10 secured to a shaft rotated by the vehicle power plant. Thus, the cam shaft may be rotated from the fan belt, for example.

Switch 8 and its operating means are designed in accordance with conventional practices so that the contacts of the switch are closed for short intervals of time and opened for much longer intervals in a repetitive manner. Thus, in a single cycle of switch operation, switch 8 may be open for 90–95% of the time and closed for the balance.

Neglecting other elements of the circuit not yet described, it will be observed that, when switch 8 is operating, the current from the generator will be cyclically interrupted and the battery 2 will accordingly be supplied with periodical pulses of direct current. Occasionally, however, the electrical loads of the vehicle require high current. This occurs, for example, during simultaneous operation of the vehicle radio, heater, defroster and lights. Such heavy load demands should be supplied entirely by the generator, in order to prevent undesirably severe discharging of the battery. To achieve this result, the coil 11 of a current relay 12 is connected in conductor 6 in series with the vehicle load 3. Relay 12 is provided with a normally open, single pole, single throw contact structure 13 connected by conductor 14 across the cyclically operated switch 8 so that, when the relay 12 is energized, swtich 8 is short-circuited. Thus, when a high current is drawn by the vehicle load 3, relay 12 is energized to short circuit, and thus electrically disable, the switch 8 so that the full, continuous output of the generator is supplied to the load. Since the conventional automotive generator is designed with more than sufficient capacity to supply the full load, a small continuous charging current is simultaneously supplied to the battery.

The embodiment of the invention shown in FIG. 1 also includes means for disabling the cyclical switch 8 whenever continuous, heavy charging currents are required. This means comprises a relay 16, the actuating coil 15 of which is connected in conductor 5 in series with the battery 2. Relay 16 is provided with a normally open, single pole, single throw contact structure 17 connected by conductor 18 across the cyclically operated switch 8 so that, when the relay 16 is energized by the heavy charging currents required by the battery, switch 8 is short-circuited, so that the full, continuous output of the generator is supplied to the battery. It should be noted that with this arrangement a large discharge current will also energize the relay 16.

Assuming that only relay 16 were employed, switch 8 would be short-circuited whenever the load 3 required a high current, the full, continuous output of the generator then supplying the vehicle load and also charging the battery. Advantageously, relay 16 is of the type exhibiting a material delay in its releases, so that, when relay 16 closes in response to a heavy battery discharge current, contacts 17 remain closed until a heavy charging current is supplied to the battery. But, when the charging current drops to normal, relay 16 will then be deenergized, opening contacts 17. The full load current would then be taken from the battery, re-energizing relay 16, so that an oscillating cycle would result. The use of both relays 12 and 16 prevents such an occurrence since, when both relays are used, cyclical switch 8 remains short-circuited so long as the charging current to the battery is sufficient to keep relay 16 energized or the current drawn by the vehicle load is sufficient to keep relay 12 energized.

Relays 12 and 16 are made marginal so that they will allow a certain amount of current to pass before actuating, but then will operate at a higher current level.

In normal daytime operation of the vehicle, the generator is required to supply about 6 amperes, 3 amperes to the loads (primarily the ignition system) and 3 amperes to maintain the charge of the battery. In the system described, with the loads being supplied from the battery about 90% of the time and the battery being charged only about 10% of the time, it would appear that the battery would soon be discharged. But, with the battery being discharged during the greater time interval, a low battery terminal voltage will be exhibited during the charging period, and the normal action of the generator system will charge the battery at a much higher rate than the usual maintaining charge rate, so that the battery is brought to a full state of charge during the relatively short period. Advantageously, this charging rate can be adjusted to a value approximating the maximum capacity of the generator, the ratio of "closed time" to "open time" of the switch 8 being designed to ensure adequate charging of the battery at that rate.

It will be apparent from the foregoing that the embodiment of the invention illustrated operates to produce intermediate or cyclical charging of the battery during daytime operation of the vehicle, when most of the driving is done and when electrical loads are relatively low. During night driving, when the electrical loads supplied by the system are heavy, the generator is allowed to supply the desired continuous charging current.

The elements of the circuit enclosed within the phantom lines of FIG. 1 are advantageously assembled as a unit in a single housing which can be mounted upon the firewall or other convenient part of the vehicle, with only the necesary lead wires or terminals and the mechanical coupling for switch 8 protruding from the housing. If desired, as when the invention is installed as part of a new vehicle during manufacture thereof, the components can be separately located.

While the embodiment of FIG. 1 employs, as switch 8, a device which is mechanically actuated, as by the vehicle power plant, other equivalent cyclical switch means can be employed. Thus, as seen in FIG. 2, the cyclical switch 8' can be of the thermally actuated type comprising a bimetallic element 7' periodically heated by a resistance 19. The resistance 19 is connected in parallel with the bimetallic element 7' via a circuit including contacts connected in series with resistance 19 and arranged to be opened when switch 8' is closed, as a result of heating the bimetallic element, and closed when switch 8' opens. A thermally actuated cyclical switch of the type comprising a bimetallic element heated by the current passing through the bimetallic element can also be employed. The switch is normally closed and opens as a result of the heating of the bimetallic element due to current passing therethrough.

The mechanical cyclical switch 8 can also be replaced by a relaxation oscillator circuit, or by electrical relay means controlled by a relaxation oscillator circuit, as disclosed in copending application Serial Number 718,284, filed concurrently herewith by Lewis A. Medlar.

While the embodiment in FIG. 1 employs one current relay 12 to short circuit switch 8 when a large current is drawn by the vehicle load 3 and a second current relay 16 to short circuit switch 8 when heavy charging currents are required to compensate for previous heavy discharges of the battery and current drawn by the vehicle load 3 is not large enough to energize the first-mentioned current relay 12, other equivalent circuits can be employed to accomplish satisfactory periodic charging of the battery. One such equivalent circuit is illustrated in FIG. 3 and is again shown as associated in a conventional automotive electrical system in the same general fashion previously described with reference to FIG. 1. In this embodiment, the output of the generator 1 is connected to the vehicle loads 3 directly via conductor 20, and to the battery 2 via conductor 4, cyclical switch 8, coil 15 of current relay 16, and conductor 5. As in the embodiment of FIG. 1, the normally open contacts 17 of relay 16 are connected in conductor 18, so that energization of relay 16 by a heavy charging current short circuits cyclical switch 8.

The battery 2 is connected directly to the load via conductor 22, a unidirectional conductor, such as a dry plate rectifier, 23 being connected in conductor 22 in series between the battery 2 and load 3, as shown. When it is necessary for the battery to supply the load 3, current flows from the battery to the load directly via conductor 22. On the other hand, unidirectional device 23 prevents the continuous output of the generator from being supplied to the battery via conductor 20 and 22.

Thus, in the embodiment of FIG. 3, the generator supplies the vehicle loads continuously, charges the battery cyclically when relay 16 is deenergized and charges the battery continuously when relay 16 is energized. The battery, on the other hand, is allowed to supply current to the load directly. In this embodiment, relay 16 responds only to heavy charging currents. Here, relay 16 need not be of a type exhibiting a delay in its release.

While the illustrated embodiments of the invention are described as applied to the electrical system of a motor vehicle, it will be clear to those skilled in the art that the invention is equally applicable to other types of electrical systems wherein a load or loads are supplied jointly by a storage battery and a second direct current source, with the latter being employed to maintain the battery in charged condition.

I claim:

1. In an electrical system of the type comprising an electrical generator, a storage battery to be charged by the generator, and an electrical load to be supplied by the battery and generator, the combination of first circuit means connecting the battery to the load, second circuit means connecting the generator output to said first circuit means, switch means connected in said second circuit means in series with the generator, means operatively associated with said switch means to actuate the same cyclically to interrupt the flow of current from the generator, said first circuit means being effective to pass current from the battery to the load when said switch means operates to interrupt the flow of current from the generator, an electromagnetic relay having its actuating winding connected in series between the battery and said switch means to respond to current flowing to the battery, a circuit portion connecting the output of the generator to a point between the winding of said relay and said switch means, the contacts of said relay being connected in said circuit portion and said relay being operative to close its contacts upon occurrence of current flow to the battery of a predetermined magnitude, and other circuit means connecting the output of the generator to the load independently of said switch means.

2. In an electrical system of the type comprising an electrical generator, a storage battery to be charged by the generator, and an electrical load to be supplied by the battery and the generator, the combination of circuit means connecting the battery and load to the generator, said circuit means including a portion connected between the generator and the battery, cyclically operable means connected in said circuit means to cyclically interrupt the flow of current from the generator to the battery, a second circuit portion connected to short circuit said cyclically operable means, a relay having its actuating winding connected in series with the battery and its contacts connected in said second circuit portion, said relay being operative to complete said second circuit portion and thereby short circuit said cyclically operable means upon occurrence of a current of a predetermined magnitude in said first-mentioned circuit portion, other circuit means connected to short circuit said cyclically operable means, and relay means connected to respond to current drawn by the load for completing said other circuit means.

3. In an electrical system of the type comprising an electrical generator, a storage battery to be charged by the generator and an electrical load to be supplied by the battery and generator, the combination of a switch, a first circuit connecting said switch and the generator in series, a second circuit connecting the battery across the series combination of said switch and the generator, a third circuit connecting the load across the series combination of said switch and the generator, means operatively associated with said switch to cyclically actuate the same to interrupt said circuit for given time periods and complete said circuit for shorter time periods, a first relay responsive to current in said second circuit, and a second relay responsive to current in said third circuit, each of said relays having contacts connected independently across said switch whereby said switch can be short circuited upon occurrence of a current of a predetermined magnitude in said second or third circuits.

4. The system of claim 3 wherein said relays are marginal.

References Cited in the file of this patent

UNITED STATES PATENTS

| | | | |
|---|---|---|---|
| 1,122,774 | Leonard | Dec. 29, | 1914 |
| 1,227,149 | Jacobson | May 22, | 1917 |
| 1,287,259 | Dixon | Dec. 10, | 1918 |
| 1,812,628 | Geiger | June 30, | 1931 |
| 2,070,541 | Beetem | Feb. 9, | 1937 |
| 2,503,179 | Tichenor | Apr. 4, | 1950 |
| 2,573,829 | Braselton | Nov. 6, | 1951 |